United States Patent
Maynard-Zhang et al.

(10) Patent No.: US 7,937,336 B1
(45) Date of Patent: May 3, 2011

(54) PREDICTING GEOGRAPHIC LOCATION ASSOCIATED WITH NETWORK ADDRESS

(75) Inventors: Pedrito U. Maynard-Zhang, Issaquah, WA (US); Daniel Lloyd, Mercer Island, WA (US); Llewellyn J. Mason, Seattle, WA (US); Samuel A. Minter, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 761 days.

(21) Appl. No.: 11/771,679

(22) Filed: Jun. 29, 2007

(51) Int. Cl.
*G06F 15/16* (2006.01)

(52) U.S. Cl. .......................................... 706/12

(58) Field of Classification Search .......... 706/12
See application file for complete search history.

(56) References Cited

U.S. PATENT DOCUMENTS 6,963,850 B1  11/2005  Bezos
7,573,916 B1*  8/2009  Bechtolsheim et al. ...... 370/542

OTHER PUBLICATIONS

Liu et al. "Combined mining of Web server logs and web contents for classifying user navigation patterns and predicting users' future requests", Data & Knowledge Engineering 61 (2007) pp. 304-330.*
Xu et al. "Decision tree regression for soft classification of remote sensing data", Remote Sensing of Environment 97 (2005) pp. 322-3336.*
Tan et al. ("Classification: Basic Concepts, Decision Tree, and Model Evaluation" in Introduction in Data Mining (by Tan, Steinbach and Kumar), Addison-Wesley, 2005, pp. 245-205, http://www-users.cs.umn.edu/~kumar/dmbook/ch4.pdf.*
Baglioni et al. ("Preprocessing and Mining Web Log Data for Web Personalization", LNAI 2829, 2003, pp. 237-249.*

* cited by examiner

*Primary Examiner* — Donald Sparks
*Assistant Examiner* — Li-Wu Chang
(74) *Attorney, Agent, or Firm* — Christensen O'Connor Johnson Kindness PLLC (57) ABSTRACT

A decision tree is provided as a machine learning classifier to predict a user attribute, such as a geographical location of a user, based on a network address. More specifically, the decision tree is constructed via machine learning on a set of sample data that reflects a relationship between a network address and a user attribute of a "known user" whose profile information is recognizable. For a given network address, the decision tree can be used as a machine learning classifier to predict the most likely user attribute of a potential user. With the predicted attribute, a network service can target a group of potential users for various campaigns without recognizing the identities of the potential users.

37 Claims, 7 Drawing Sheets

PREDICTING GEOGRAPHIC LOCATION ASSOCIATED WITH NETWORK ADDRESS

BACKGROUND

Network-based services commonly provide information to influence or attract a particular group of users based on the interest or locality of the group. For example, a network-based advertising campaign may involve disseminating advertising information that is tailored for a target group based on the interest, behavior, or locality of the users in the group. Accordingly, the advertising campaign may provide the target group with information that is invaluable to users within the target group, but is less meaningful to users outside of the target group. Thus, determining an appropriate target group for disseminating information to is often the first step in creating an effective advertising campaign. In order to determine the appropriate target group for an effective campaign, various user attributes from user profile information are often used. For example, if an advertising campaign is targeted for a group of young females who have purchased XYZ perfume, attributes such as age and purchase history may be obtained from the user profile information. However, user profile information is not always available for users, especially for those potential users who do not register with the service and/or have no intention to provide user profile information.

Many network-based services want to attract potential users by providing relevant advertising or other meaningful information targeting the potential users. This is particularly true when potential users visit and interact with the network-based service, e.g., via a website for the network-based service. While potential users are interacting with the website, the well-targeted information can lead those potential users to request network services that are conveniently accessible via the website. Generally, each interaction or "click" on the website can provide some information (hereinafter "clickstream data") about a potential user, e.g., the Internet Protocol (IP) address information of the computing device being used by the user. Although there have been some attempts to utilize IP address information for predicting or guessing profile information of the potential user, the ability to accurately and efficiently target potential users by predicting or guessing user attributes based on clickstream data is not quite developed. Further, even if certain user attributes can be predicted based on the clickstream data, it is difficult to estimate the accuracy of the predicted user attributes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method is provided to classify a user group for a potential user based on a network address obtained from the potential user's activity. The method comprises obtaining information generated from a user's interaction with a network-based service and identifying the network address of the user device. The network address is provided to a classifier, which has been constructed to return at least one class of a predicted attribute for a given network address. The predicted attribute is obtained from the returned class. In an aspect of the method, a user group that corresponds to the class is determined in order to obtain campaign information targeting the user group. The campaign information is transmitted to the user device. Each node of the qualified tree is assigned an attribute value along with a coverage rate (proportion of qualification data for which the decision tree produces certain predictions, i.e., which are not resulted as an unknown attribute), an accuracy rate (the proportion of qualification data for which the decision tree produces correct predictions), and confidence interval for the accuracy rate.

In accordance with another aspect, a method is provided to generate a decision tree which is utilized to predict a user group for a user, based on network address information that is transmitted from a user device. The method comprises obtaining a first set of sample data which includes a network address and user profile information and training a decision tree with the first set of sample data in a manner that a leaf node of the trained decision tree corresponds to a network address and an attribute value. Generally, the attribute value is correlated with the network address. A second set of sample data is obtained to produce an optimal tree through a pruning process. A third set of sample data is obtained to qualify the optimal tree.

In accordance with yet another aspect, a computer-readable medium having computer-executable components encoded thereon that are configured for mapping an attribute of a user to a network address is provided. The computer executable components include a request process component for receiving information which is generated from a user's activities over a network, wherein the information includes a network address of a user device operated by the user and identifying the network address from the received information, a classifier component for determining a class that generates a highest accuracy number for the identified network address, wherein the classifier component is constructed to predict an attribute of a user based on a network address. The computer-executable components further include a machine learning component for obtaining the attribute of the user and an accuracy number from the classifier component.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present disclosure relate to a method and a system that are directed to utilizing a machine learning classifier to predict a user attribute, such as a geographical location of a user, based on a network address. As will be described in more detail below, a decision tree is constructed via machine learning on a set of sample data. The decision tree reflects a relationship between a network address and a user attribute of a "known user." The "known user" refers to a user whose identity is recognized by a network service and thus user profile information of the user is available. The constructed decision tree is used as a classifier to predict a user attribute of a potential user whose identity has not been recognized by a network service. The classifier also includes accuracy information for each prediction. For example, the classifier can be built to return a geographic location which generates the maximum expected utility/accuracy for a given network address, and the network service can utilize the classifier to predict a most likely location of a potential user based on a network address of a user device. With the predicted attribute of a potential user, a network service can target a group of potential users for various campaigns.

It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links. In addition, numerous specific details are set forth in the following description in order to provide a thorough understanding of the described embodiments. However, it will be apparent to one skilled in the art that the various embodiments may be practiced without some or all of these specific details. In other instances, well-known process steps have not been described in detail in order not to unnecessarily obscure the descriptions of the various embodiments.

Figure 1:
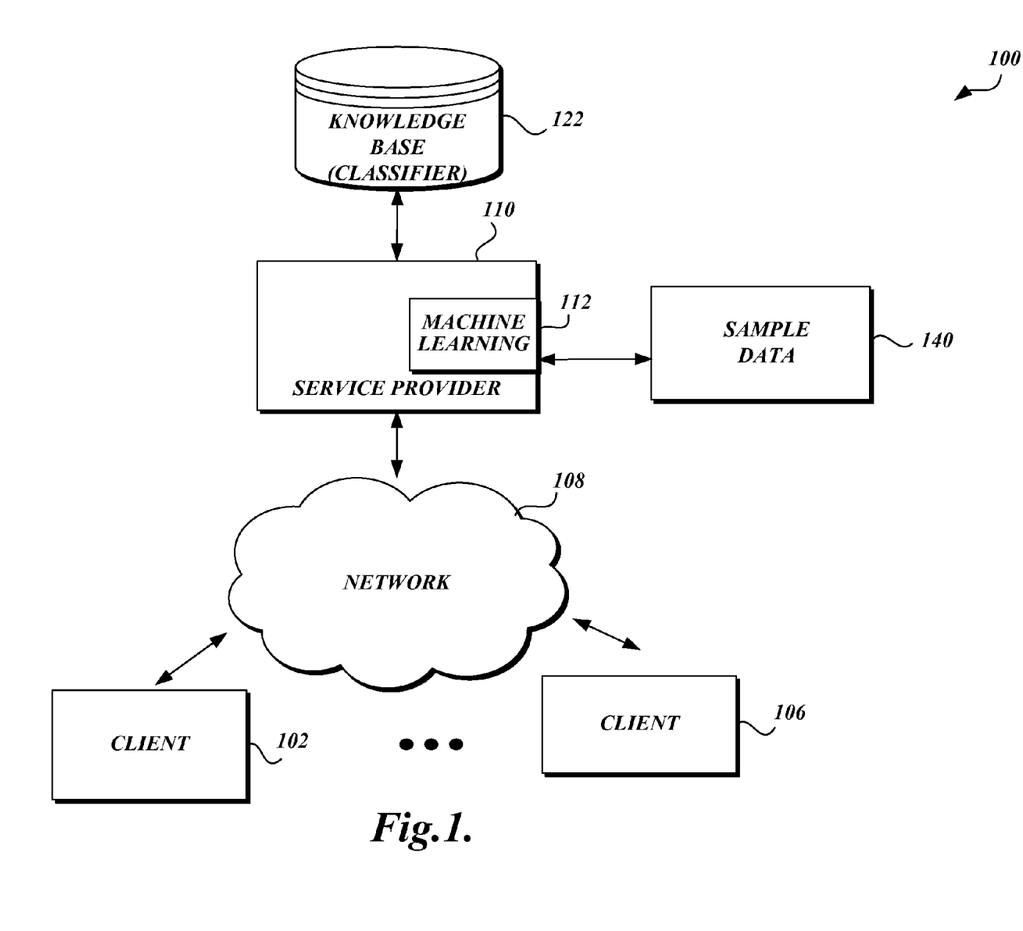
FIG. 1 is a block diagram depicting an illustrative networked environment 100 suitable for obtaining a predicted user attribute with high accuracy and for classifying a user into a target group based on the predicted user attribute.

Referring to FIG. 1, a block diagram depicts an illustrative networked environment 100 suitable for predicting a user attribute with high accuracy for a user and classifying the user into a group based on the predicted user attribute. The illustrative networked environment 100 of FIG. 1 includes a service provider(s) 110 for providing network services, for example, network purchasing services, network-based community services, catalog services, yellow page services, etc. As shown in FIG. 1, the service provider 110 may also include a knowledge base 122 and a machine learning component 112. The knowledge base 122 provides data storage of various types of data, one or more classifiers to predict user attributes, a set of threshold values, etc., and may be organized as desired, e.g., by using data structures optimized for representing a classifier built through machine learning on a set of sample data.

As will be discussed in a greater detail below, the process of constructing a classifier for predicting a user attribute may be done by analyzing the collected sample data to extract knowledge of the known relationship between network addresses and a set of user attributes, and organizing such knowledge in a hierarchical or structured format. In one embodiment, the classifier is a decision tree that is constructed via machine learning on sample data collected from registered/known users. The sample data reflects a relationship between identifying information (such as a network address, a social security number, etc.) and a user attribute of a known user. As will be discussed in greater detail, the identifying information may be any identifier as long as the identifier can be represented in a hierarchical structure. The user attribute may be any type of attribute which has some correlation with the hierarchical structure of the identifiers. For example, user attributes which have some correlation with the network addresses may include, but are not limited to, a geographic location of a user's device, a membership to a particular network community, Internet service provider (ISP) information, company, household income that is correlated with geographic location, or network connection related information such as dialup, cable, or mobile, etc.

The source of the sample data can be a service provider, a third-party service provider, or the like. The classifier may be used to predict a user attribute of a potential user whose identity has not been recognized by a network service. For example, the classifier can be built to return a prediction, a most likely attribute of a user for a given identifier, and optionally, an expected accuracy of the prediction. The result from the classifier can be utilized to classify a group of potential users based on the prediction.

As will be appreciated by one skilled in the art, the classifier can be either a part of the service provider 110 or a separate entity which is in communication with the service provider via a network 108, for example, the Internet. Further, the classifier may be periodically updated with a new set of sample data.

The networked environment 100 may also include one or more client devices, such as client devices 102-106, to which a service provider 110 provides network services. The client devices 102-106 communicate with the service provider 110 via a communication network 108, such as a local area network, a wide area network, an intranetwork, an internetwork, or the Internet. The client devices 102-106 are typically computing devices including a variety of configurations or forms such as, but not limited to, laptop or tablet computers, personal computers, personal digital assistants (PDAs), hybrid PDA/mobile phones, mobile phones, electronic book readers, set-top boxes, workstations, and the like.

Figure 2A:
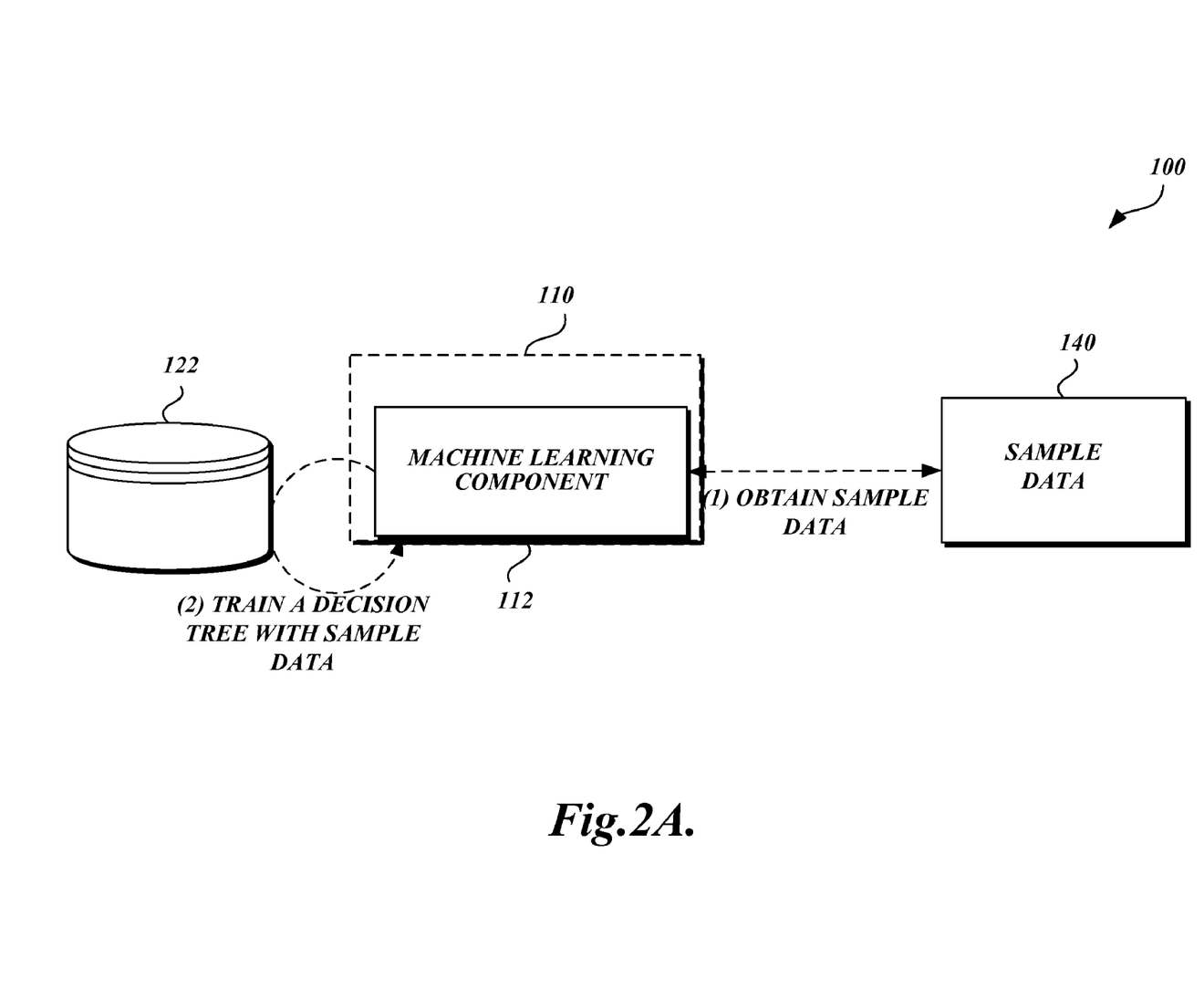
FIGS. 2A and 2B are block diagrams depicting illustrative interactions of various components in the network environment shown in FIG. 1 when a classifier is constructed to predict a location of a potential user for a given network address.
Figure 2B:
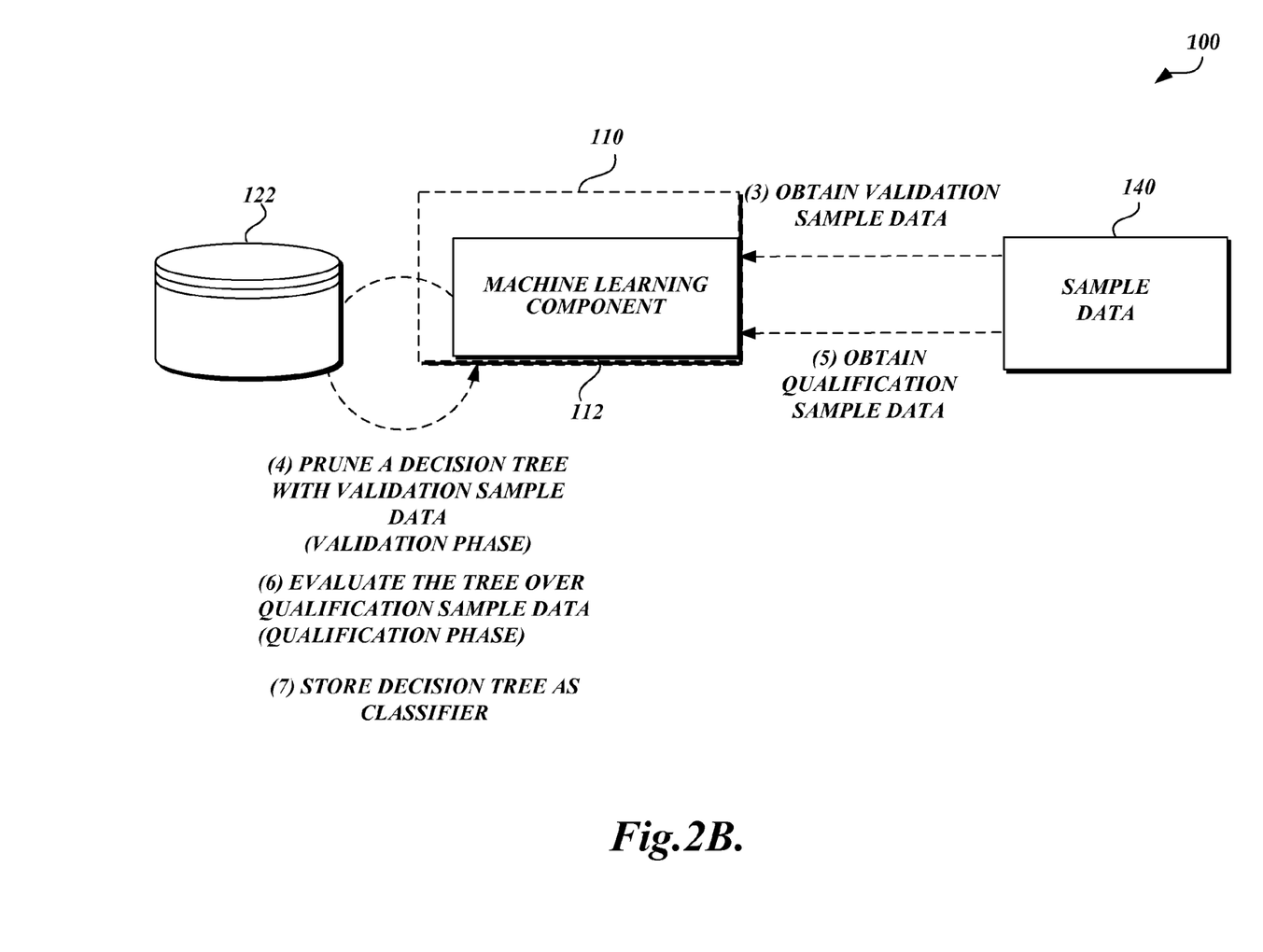

Referring now to FIGS. 2A-2B, block diagrams depict illustrative interactions of various components in the network environment 100 when a decision tree is constructed to predict an attribute of a user based on certain identifying information, such as a network address related to the user. As will be discussed above, the identifying information may be any identifier as long as the identifier can be represented in a hierarchical structure. An example of an identifier includes a social security number, an IP address, or the like. Further, it is to be noted that the attribute which is predicted by the decision tree can be any attribute with which the hierarchical structure of the identifying information is correlated.

In an illustrative embodiment, the correlation between an attribute and a hierarchical structure of identifying information may contribute to increased efficiency in constructing the decision tree. That is, a decision tree may be constructed in accordance with the hierarchical structure of the identifying information, which allows the decision tree to be constructed without deciding what to split at a node, i.e., without choosing the best splitter (the best splitting criterion) at a node. In the conventional decision tree construction, every possible split is evaluated and considered in order to choose the best split at a node. This process is time consuming since it is continued at the next node until a maximum tree is generated. Thus, the overall computation to construct a decision tree in described embodiments maybe significantly smaller than the overall computation to construct a conventional decision tree. For ease in discussion, the described embodiments are explained in conjunction with a decision tree that is constructed to predict a geographic location for a given network address.

However, the described embodiments are used for illustrative purposes only and should not be considered limiting.

As shown, the service provider 110 may include a machine learning component 112 that is configured to construct a decision tree by analyzing a set of sample data. As will be appreciated by one skilled in the art, decision tree learning is an inductive machine learning mechanism that extrapolates accurate predictions about future examples from a given set of examples. Once constructed, the decision tree may be used to classify additional examples, i.e., assign an example to a discrete class. A decision tree can also provide a measure of confidence that the classification is correct, for example, a coverage rate (proportion of qualification data for which the decision tree produces certain predictions, i.e., which are not resulted as unknown), an accuracy rate (the proportion of qualification data for which the decision tree produces correct predictions), and confidence interval for the accuracy rate. In one embodiment, the confidence interval for the accuracy rate may be maintained at a certain percentage, such as a 95% confidence interval for the accuracy rate. The confidence interval for the accuracy rate indicates how reliable the estimated accuracy rate is. Thus the 95% confidence interval for the accuracy rate may indicate that the estimated accuracy rate is correct with 95% of confidence.

In the illustrated embodiment, a set of sample data 140 is provided to the machine learning component 112 that reflects the relationship between a user attribute and a network address of a known user. For example, the set of sample data 140 reflects the relationship between a geographic location of a user and an IP address of a user device. The set of sample data may be analyzed to identify a fixed number of geographic location classes. A decision tree may then be constructed to receive an IP address and return a geographic location class with the highest accuracy with respect to the received IP address.

As shown in FIG. 2A, the service provider (machine learning component 112) obtains a first set of sample data (hereinafter, "training sample data"). In one embodiment, the sample data may be collected from "clickstream data" provided by the service provider 110. "Clickstream data" refers to visitor logs and statistics that provide information about the user's interaction with a network-based service without identifying the user. "Clickstream data" generally includes an IP address of the device responsible for the interaction or "click" at the time of a click, a session identifier, etc. An IP address is a unique address that devices use in order to identify and communicate with each other on a computer network utilizing the Internet Protocol standard (IP). Any participating network device can have their own unique address.

As mentioned above, a decision tree may be constructed through machine learning using clickstream data. In order to apply such machine learning, sample data may be obtained from the clickstream data generated from "known users" whose identities are recognized by the service provider 110. Since the identities are recognized, user profile information including, but not limited to, geographic information such as a residence location or billing address, may be obtained. During a session, a user may click on a webpage one or more times, and for each click an IP address associated with the user is identified and logged. This IP address may be associated with the user's computing device or some other proxy between the service provider 110 and the client 102. Each identified IP address may be associated with the known information about the user, such as the residence location or other geographical information of the user, and be part of the sample data. Accordingly, the sample data may include a unique pair, i.e., an IP address, and known user information, for example a residence location, billing information, purchase history, etc. The sample data may be divided into several sets of sample data, each of which is utilized in different phases in building a decision tree, such as a training phase, validation phase, and testing/qualification phase.

In one embodiment, a decision tree is constructed by converting each IP address in the sample data into a finite number representation. As will be appreciated, because an IP address is represented in a hierarchical structure, a subtree of the decision tree can be constructed independently from other parts of the decision tree. In addition, the hierarchical structure of an IP address is correlated with a certain attribute of known users. Since the Internet Protocol has several versions in use and each version has its own definition of an IP address, an IP address may be converted into a different number bit representation depending on the version. In particular, IPv4 uses 32-bit (4 byte) addresses and IPv6 uses 128-bit addresses. As will be discussed in greater detail below, the sample data may be sorted by an IP address in the left-to-right bit order so that user attributes can be selected in a fixed order from the classifier. In that way, a leaf node in the decision tree can represent a block of IP addresses in Classless Inter-Domain Routing (CIDR) notation, which allows the formation of a cluster of IP addresses. Conventionally, Internet Assigned Numbers Authority (IANA) and its associated Regional Internet Registry (RIR) allocate IP address blocks according to CIDR notation, that is, chunks defined by shared prefix bits of the IP addresses. Thus, the mapping of IP addresses to owners (e.g., ISPs) can naturally be represented as a decision tree where the attributes are the bits in the 32-bit IP address, which makes the construction of a decision tree efficient. That is, unlike a conventional learning tree construction, the described embodiments do not require to make a decision as to what to split (i.e., to determine the best split criterion) at a node while constructing a decision tree. Instead, the machine learning component 112 may only have to decide when to stop splitting because the hierarchical structure of an IP address is correlated with the user attribute, such as geographic information. With the training sample data, the machine learning component 112 may construct a decision tree by assigning a best classification to a leaf node for a given IP address and residence location pair. The structure of the decision tree decomposes class assignment computation. That is, the service provider 110 may check the subset of the training sample data associated with the leaf node to determine the best classification. For example, a fixed set of location classes are predefined for classification. From the training data, the machine learning component may learn that a subset of the sample data (several IP address and residence location pairs) can be classified into a location class. Accordingly, the location class is assigned to a leaf node for the subset of the sample data. The training phase will be completed when a "maximum tree" is generated given the training sample data. The "maximum tree" refers to a tree generated when the service provider 110 splits tree nodes until all the training sample data are classified into a particular class and thus an exclusive subset of the training sample data corresponds to a leaf node. For example, the maximum tree may have one leaf node corresponding to each IP address in the training sample data.

Referring to FIG. 2B, after the service provider 110 constructs a maximum tree using the training sample data, the service provider 110 obtains a second set of sample data for a validation (pruning) phase. The second set of sample data (hereinafter, "validation sample data") may be part of the sample data that have been collected from clickstream data generated from "known users." The maximum tree generally overfits the training sample data, which requires pruning the maximum tree. The validation sample data will be used to determine when to prune the maximum tree generated in FIG. 2A. The resulting tree after the validation phase is an optimal tree that minimizes the error in each node over the validation sample data. In one embodiment, the service provider 110 may define the optimal tree recursively: given the maximum tree, each node keeps its child nodes if the estimated error associated with the optimal subtree rooted at the children is equal or less than the estimated error associated with the node that has no children. It is to be understood that various pruning methods can be utilized during the validation phase and will be discussed later in conjunction with FIGS. 3A-3B.

As also shown in FIG. 2B, subsequent to the validation phase, the service provider 110 may perform a qualification phase. Accordingly, the service provider 110 may obtain a third set of sample data to use for the qualification phase where expected accuracy of a classification may be evaluated. The third set of sample data (hereinafter, "qualification sample data") may be a part of the sample data which are also collected from clickstream data generated from "known users." The service provider 110 will evaluate each node by calculating the estimated accuracy of each node over the qualification sample data. For example, for a given IP address, a predicted residence location generated from the decision tree may be compared with the known residence location of the IP address. The known residence location of the IP address may be determined from the qualification sample data. The service provider 110 stores with each node the number of correctly classified sample data and incorrectly classified sample data during the qualification phase performed over the qualification sample data. Those stored numbers may be used to calculate the expected accuracy rate (proportion of qualification data for which the decision tree produces correct predictions) or error rate (proportion of qualification data for which the decision tree produces incorrect predictions) at the node, and the confidence intervals of the accuracy rate for the individual node. With the expected accuracy and confidence value, the service provider 110 may determine a threshold error rate which will be used as a cutoff parameter to determine whether to accept the classification or not. The predicted attribute with an expected error rate higher than the threshold error rate will not be accepted and may be considered as an "Unknown" attribute. After the qualification phase, the decision tree may be stored as a classifier to predict a user attribute for a given network address.

In one embodiment, a decision tree may be constructed for a particular enterprise over sample data collected for the particular enterprise. In such an embodiment, the constructed decision tree may be delivered to the particular enterprise where the decision tree may be utilized as a local classifier.

Figure 3A:
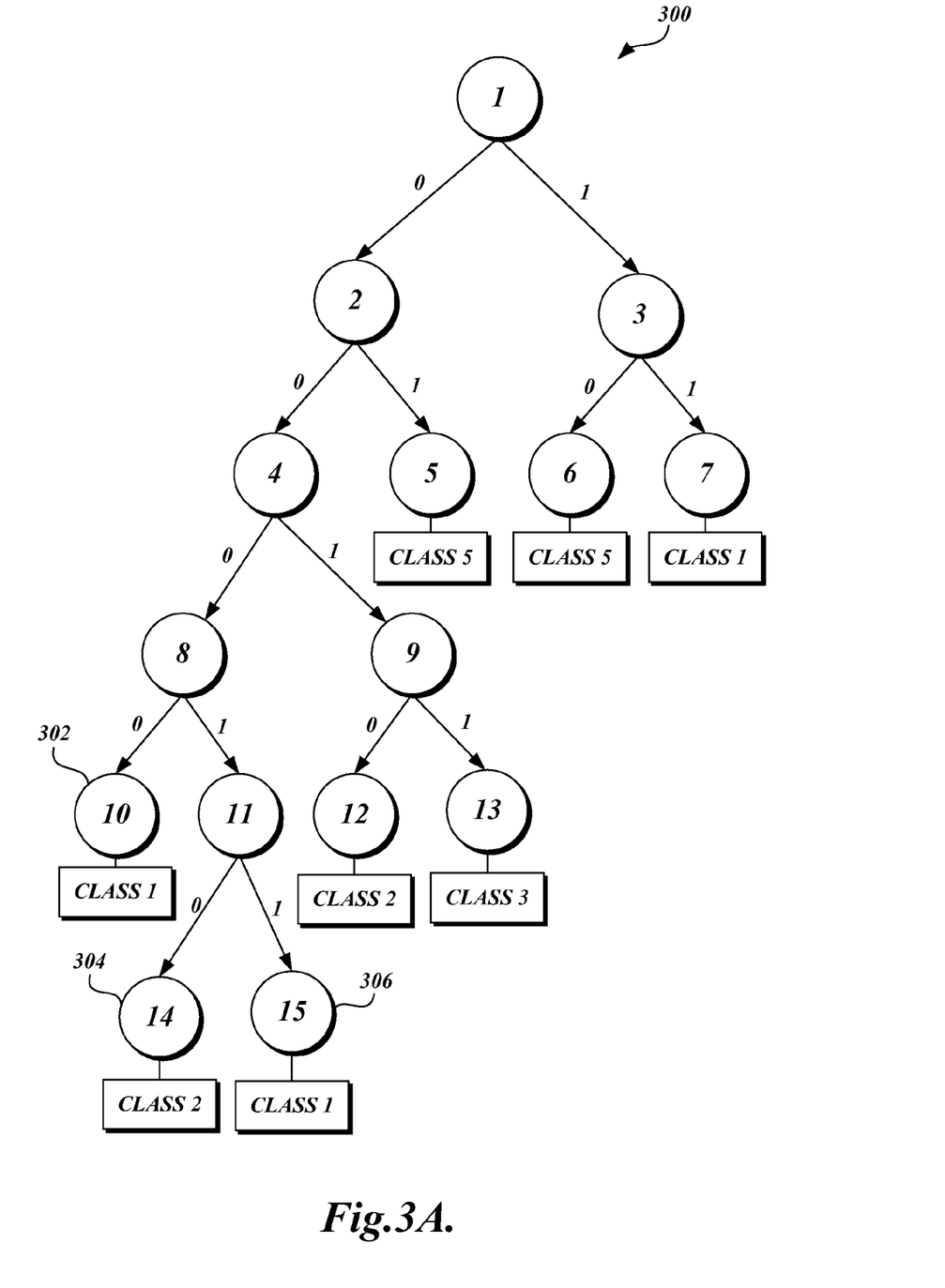
FIGS. 3A and 3B are block diagrams depicting an illustrative decision tree construction used to generate the classifier utilized in FIGS. 2A and 2B.
Figure 3B:
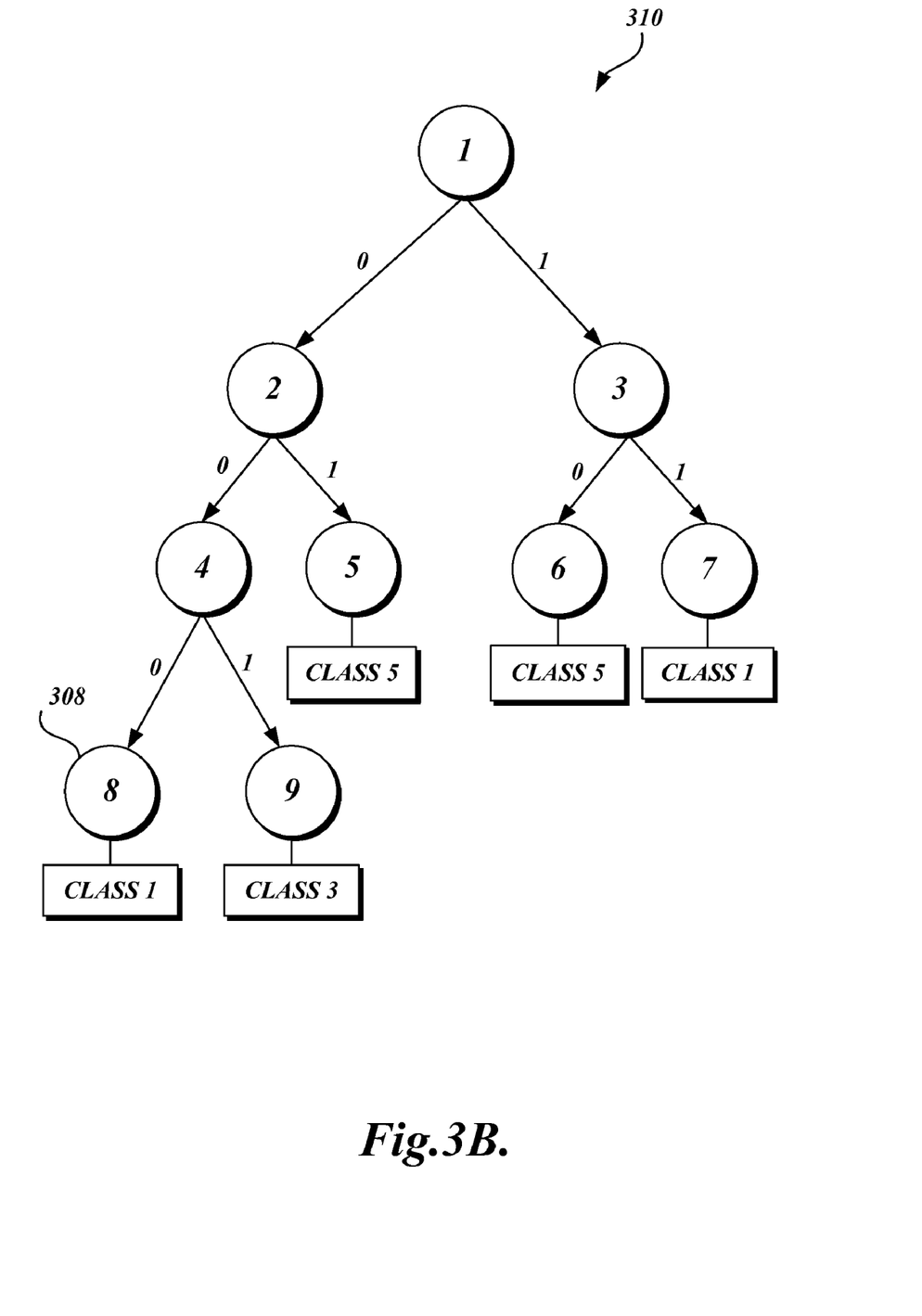

Referring now to FIGS. 3A and 3B, block diagrams depict a portion of an illustrative decision tree 300 in accordance with one embodiment. As depicted, the illustrative portion 300 represents the last 8 bits of IP addresses, assuming that the sample data share prefix bits of the IP addresses. For the purposes of discussion, assume that the decision tree is constructed to predict the "state" where a user resides if an IP address of a user device is given. A fixed number of classes, such as the 50 states of the United States, is predefined to construct the decision tree to predict the "state" for a potential user whose identity is not known to the service provider 110. As noted above, a decision tree 300 may be constructed over the training sample data which include information, such as an IP address of a known user device and "state" information of the known user. For example, when a known user who resides in Washington state logs in to the service provider 110, an IP address of a user device is collected and profile information of the known user is obtained. The state (Washington) where the user resides may be identified from the user profile information including, but not limited to, the residence address, billing address, or shipping address of the user. The collected IP address is associated with the identified state, generating a unique IP address and state pair (IP address, state) which becomes a part of the sample data.

After the training phase, a maximum tree is constructed and each leaf node may be mapped from a corresponding IP address or a block of IP addresses to a class. As shown in FIG. 3A, each IP address or block of IP addresses is associated with a leaf node. That is, any IP address of a block of IP addresses may be classified into a single leaf node. For example, a leaf node 302 may be associated with a first block of IP addresses, such as from 0000.0000 to 0000.1111 and assigned with "class 1." In this example, a user device having an IP address in the range of 0000.0000-0000.1111 will be mapped into "class 1" through the decision tree. Likewise, a leaf node 304 associated with a second block of IP addresses (0001.0000-0001.0111) may be assigned to "class2," and a leaf node 306 associated with a third block of IP address (0001.1000-0001.1111) may be assigned with "class 1" and so forth. Here, each class corresponds to a "state" in the United States.

After the maximum tree is constructed, the maximum tree will be pruned and optimized over the validation sample data. As noted above, the maximum tree is pruned to cure overfitting. "Overfitting" is a problem in large, single-tree models where the model begins to fit noise into the data. When such a tree is applied to data that are not part of the sample data, the tree does not correctly perform (i.e., it does not generalize well). To avoid this problem, the maximum tree is pruned to the optimal size.

In one embodiment, the service provider 110 may use post-pruning to compute the optimal tree using local pruning decisions, i.e., localized computation of error. As with the training phase, the service provider 110 may need to check a subset of the validation sample data associated with the node/subtree. In such cases, starting from a fringe node (e.g., far left leaf node) of the tree, the service provider 110 iteratively considers each split to add child nodes. Therefore, the service provider 110 compares the weighted sum of estimated errors for the subtrees of a particular node and the estimated error for the particular node without the split. If the weighted sum of estimated errors for the subtrees is larger than the estimated error without the split, the provider will discard the subtrees.

In yet another embodiment, the service provider 110 may use a pre-pruning method to compute the optimal tree. In pre-pruning, the splitting decisions are made as the tree is grown, so the training and validation phases are intertwined. To achieve optimality, the service provider 110 may build the tree from the bottom up so that each decision on whether or not to split a node can be based on the relative performance of all possible subtrees that might result from the split. As the service provider 110 builds the tree, the service provider only decides to split a node further if the error rate on the validation sample data for some subtree resulting from the split is as small as the error rate before the split. Of course, if the node does not already perfectly classify the associated subset of the validation data, there is no need to split further. In one embodiment, to further eliminate unnecessary splitting, the service provider 110 may include a threshold on the localized error at the node and stop splitting when the calculated error drops below the threshold error. In this manner, a smaller and more manageable decision tree can be constructed without significantly affecting classification quality. The threshold error may be determined through an experiment on various sets of sample data.

After the validation phase, the service provider 110 uses another set of sample data (qualification sample data) to calculate the estimated accuracy at each node. For example, the service provider 110 evaluates each leaf node of the decision tree over the qualification sample data. As mentioned above, the qualification data includes a series comprised of a unique pair of an IP address and a residence state of a known user. For each IP address and residence state pair (x,y) in the qualification sample data, a class (z) assigned to a leaf node corresponding to the IP address (x) may be compared with the residence state (y). If the class (z) is equal to the residence state (y), the data (x,y) is considered to be correctly classified through the decision tree. If the resultant leaf node class (z) is not equal to the residence state (y), the data (x,y) is considered to be incorrectly classified through the decision tree. After the qualification phase, the service provider 110 can calculate the number of errors and the error rate based on the number of incorrectly classified data and the number of correctly classified data. FIG. 3B depicts a portion of a decision tree constructed after the machine learning component implements the validation and qualification phase. As shown, a decision tree 310 having a smaller number of nodes than the maximum tree 300 is the result of the validation phase.

For example, nodes 10, 11, 14, and 15 of the maximum tree 300 have been pruned (discarded) during the validation phase and node 8 becomes a leaf node 308 as shown in FIG. 3B. After the qualification phase, each leaf node of the optimal tree 310 may store an estimated accuracy or error rate with respect to a classification of an IP address.

As described above, if the estimated error at a leaf node is higher than a threshold error, a resulting class from the leaf node will not be accepted and be considered as an "Unknown class." It is to be understood that the decision tree classification described above is for illustrative purposes and should not be construed as limiting. It is contemplated that any type of machine learning method or paradigm other than decision tree classification can be utilized to build the classifier to predict a user attribute.

Figure 4:
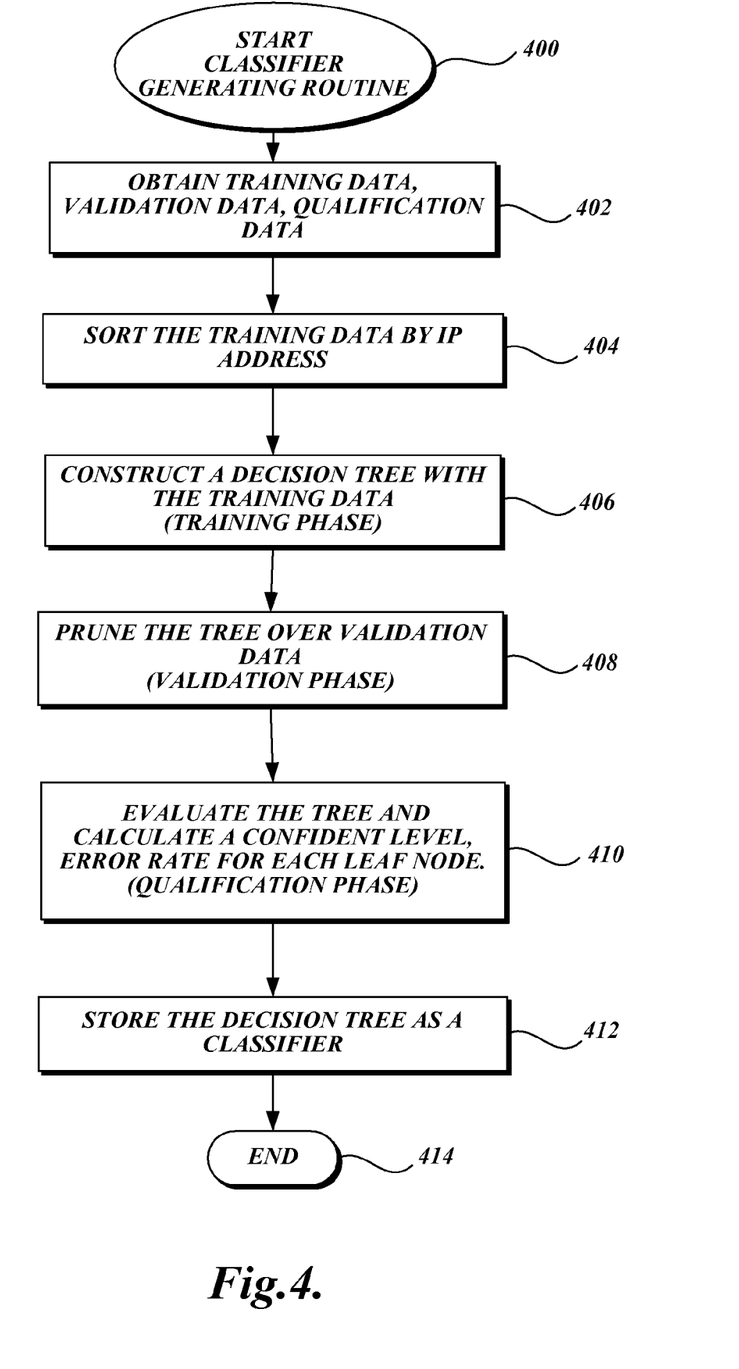
FIG. 4 is a flow diagram depicting an illustrative classifier generating routine for constructing a decision tree based on a set of sample data.

With reference to FIG. 4, a flow diagram 400 depicts an illustrative classifier generating routine for the machine learning component 112 to construct a decision tree based on a set of sample data. For the purpose of discussion, assume that a classifier is a decision tree that is utilized to predict the most likely location of a potential user based on an IP address of a user device. Assume further that the decision tree is constructed over a set of sample data which includes information, such as an IP address of a known user device and "state" information for the known user.

Beginning with a block 402, the sample data are obtained from a local data store or a third party's data store. As described above, the sample data may be obtained from clickstream data generated from user interactions with a network-based service. The clickstream data may be processed into sample data suitable for constructing a decision tree. For example, the clickstream data is processed into a sequence of user identification, an IP address, and session identifier for each user interaction with a network-based service. The user interaction can include a click on a webpage, a hit with a field displayed in a webpage, etc. In addition, the residence state information may be obtained from the user profile information of each user. The obtained residence state information may then be associated with the IP address generated from the clickstream data. Several sample data sets may be obtained, including a training data set, a validation data set, and a qualification data set. At block 404, the training data set may be sorted by IP addresses and state ID so that each leaf node in the constructed tree can represent a block of IP addresses. In one embodiment, the sample data may be sorted by an IP address in the left-to-right bit order. In that way, a leaf node in the tree can represent a block of IP addresses in CIDR notation, which allows the formation of a cluster of IP addresses.

At block 406, a decision tree is constructed by applying machine learning on the training sample data. In one embodiment, the service provider 110 constructs the tree by making a linear pass through all the training data. A leaf node of the decision tree may correspond with a "state" class. At block 408, the constructed decision tree is validated over the validation data set. The decision tree may be pruned to cure an overfitting problem by applying the validation data. After validation, the decision tree is an optimal tree that is a "prefix" of the maximum tree (i.e., it shares the maximum tree's root) that minimizes the error at each node over the validation set. As discussed above, the decision tree can be validated via any suitable pruning methods.

At block 410, the service provider 110 may perform a qualification phase on the optimal decision tree as described in FIGS. 2B and 3B. In one embodiment, the service provider 110 will calculate an error rate, confidence level, etc., for a classification in each leaf node utilizing the qualification sample data. During the qualification phase, the service provider 110 iterates though the qualification sample data and nodes in the optimal decision tree, estimating an error rate and confidence level for each leaf node. After the qualification phase, the service provider 110 stores the decision tree to use as a classifier that returns a highly accurate prediction on a residence state of a potential user for a given IP address, as depicted at block 412.

Figure 5:
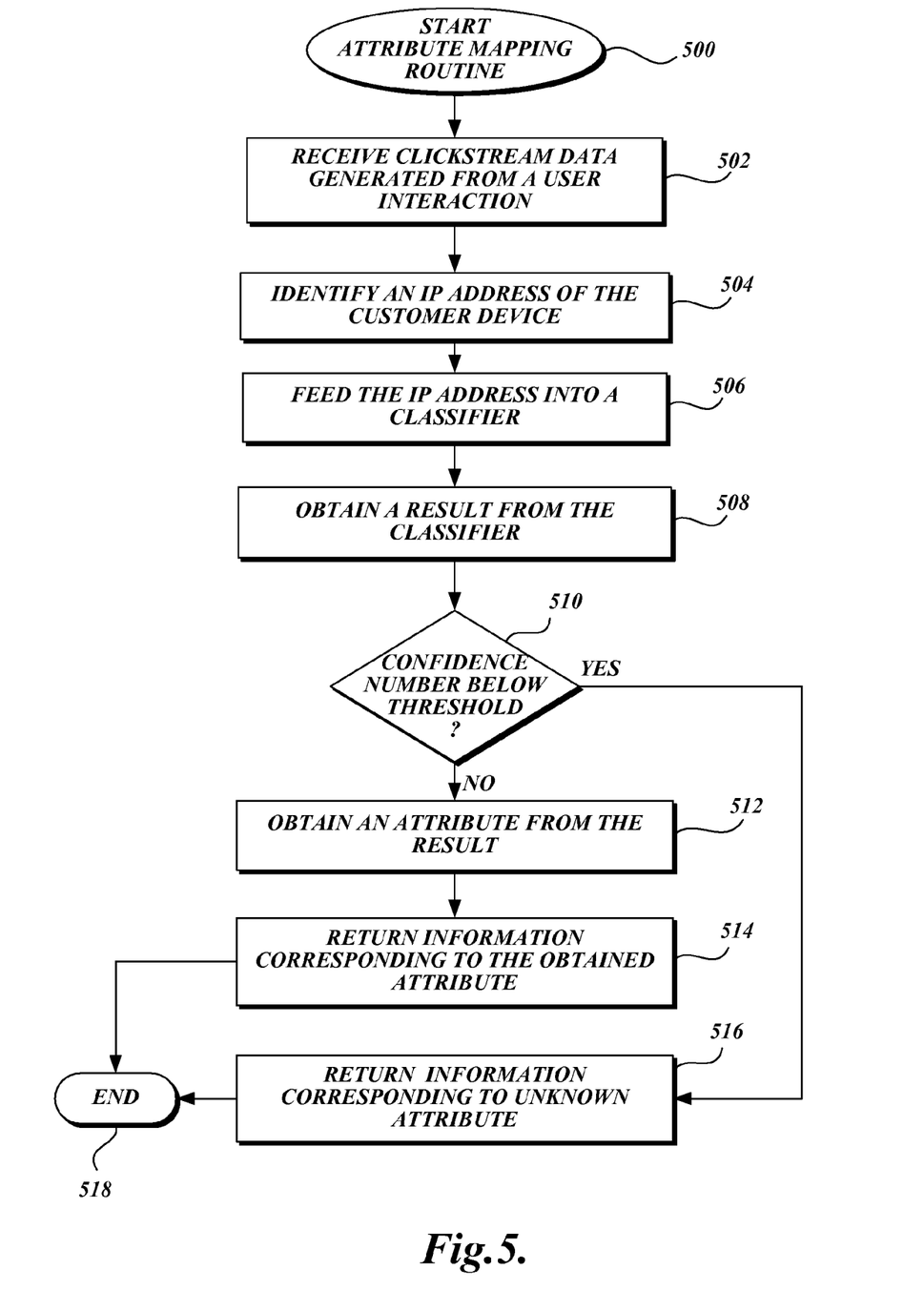
FIG. 5 is a flow diagram depicting an illustrative attribute mapping routine for utilizing the classifier to predict an attribute of a potential user while the potential user is interacting with a network-based service.

Referring now to FIG. 5, a flow diagram 500 depicts an illustrative attribute mapping routine for utilizing a classifier to determine an attribute of a potential user while the potential user is interacting with the network-based service. As with FIG. 4, assume that the classifier has been built to predict the most likely location of a potential user based on an IP address of a user device that is used to access the network-based service. With the predicted location of a potential user, a service provider 110 can target a group of potential users for various campaigns. For example, the service provider 110 may want to provide a campaign specifically designed for users in a particular geographic area. After a most likely location of a user is predicted via the classifier, the service server may identify a campaign targeting users in the location, and present the identified campaign to the user.

Beginning with block 502, the service provider 110 receives clickstream data generated from a user's interaction with the network-based service. At block 504, an IP address of a user device is identified from the received clickstream data. The identified IP address may be converted into an integer (e.g., a 32-bit representation) so that the IP address is suitable for the classifier to process.

At block 506, the IP address information is provided to the classifier which is configured to find a leaf node representing the IP address information. As mentioned above, one of a fixed number of classes may be assigned to each leaf node in the classifier. The classifier may return a result corresponding to the leaf node. At block 508, the service provider 110 will obtain a result from the classifier. The result may be a class having the highest accuracy with respect to the IP address information. The result may also include an accuracy number, number of data, a confidence number, etc. At decision block 510, it is determined whether a confidence number is below a threshold confidence. The threshold confidence may be a minimum confidence for the resultant class to be acceptable as a prediction. If the confidence level of the resultant class is below the threshold, the service provider 110 may disregard the resultant class. Accordingly, at block 516, the service provider 110 may return to the user device the campaign information prepared for a group of users whose locations are not identified. Returning back to decision block 510, if it is determined at decision block 510 that the confidence level corresponding to the class is not below the threshold confidence, the user attribute, for example, a location of the user, is obtained from the result that was returned from the decision tree at block 512.

The service provider may want to predict the location of the user in order to provide relevant advertising or other meaningful information targeting a group of users in the same area. At block 514, the service provider 110 may identify a group of users who share the obtained user attribute. The service provider 110 may return the campaign information prepared for the identified group. The user whose identification is not known will receive the campaign information targeting the group of consumers. In this manner, while the user is interacting with the network-based service, the well-targeted information may be presented to the user, thereby attracting the user to request network-based services that are conveniently accessible. The routine completes at block 518.

Although the aforementioned illustrative embodiments are described in conjunction with a decision tree for predicting geographical location of a user, it is contemplated that the classifier can be utilized to predict any type of user attributes that are correlated with the hierarchical structure of a network address. Such user attributes may include, but are not limited to, company, household income that is correlated with geographic location, and network connection related information such as dialup, cable, or mobile connection, etc. For example, a service provider 110 may support the ability to target known users based on various user attributes including purchase history, browse behavior, membership in a user list, and geographical location of residence. However, a substantial number of visitors (potential users) to a website are unrecognized by the service provider, i.e., the users have not logged in. In that case, a classifier can be constructed to predict one of those attributes, which can then be utilized to target the potential users. For another example, a service provider 110 allows content schedulers to target their campaigns to specific subpopulations of the users that visit the website so as to maximize the campaign's effectiveness and increase users' competitiveness. A classifier can be constructed to predict a specific sub-population for a potential user based on a network address.

While illustrative embodiments have been illustrated and described, it will be appreciated that various changes can be made therein without departing from the spirit and scope of the invention.

What is claimed is:

1. A computer system for generating a decision tree for predicting a geographic location based on an internet protocol (IP) address associated with a user, the computer system comprising:
   a data store containing a decision tree that is constructed to produce a predicted geographic location for an IP address associated with the user; and
   a computing device in communication with the data store, wherein the computing device is configured to:
   obtain a first set of sample data which includes IP addresses and user profile information, wherein the user profile information includes geographic location information correlated with an IP address;
   train the decision tree with the first set of sample data, wherein the decision tree includes a number of leaf nodes and each leaf node of the decision tree associates at least one IP address and a predicted geographic location;
   obtain a second set of sample data which includes an IP address and user profile information including geographic location information correlated with an IP address;
   prune the trained decision tree with the second set of sample data;
   obtain a third set of sample data which includes IP addresses and user profile information including geographic location information correlated with an IP address; and
   qualify the decision tree with the third set of sample data, wherein after qualification, each leaf node is assigned a confidence number, wherein the confidence number indicates a degree of accuracy of the predicted geographic location associated with at least one IP address corresponding to the leaf node.

2. The computer system of claim 1, wherein the first set of sample data, the second set of sample data, and the third set of sample data are collected from recognized users whose profile information is readily available.

3. The computer system of claim 1, wherein the trained decision tree is pruned in order to produce an optimal decision tree which has a small number of nodes.

4. The computer system of claim 1, wherein the computing device is further configured to feed an IP address of a user into the qualified decision tree to produce the predicted geographic location of the user.

5. The computer system of claim 4, wherein the computing device is configured to ignore the predicted geographic location if the confidence number for the predicted geographic location of the user does not meet a threshold confidence level.

6. The computer system of claim 1, wherein the computing device is further configured to convert each IP address in the sample data into a bit representation.

7. The computer system of claim 6, wherein a path in the trained decision tree corresponds to the bit representation of at least one IP address.

8. A computer-implemented method for predicting a geographic location of a user who accesses a network-based service and whose identity is not recognized, the computer-implemented method comprising:
   obtaining, with a computer, an internet protocol (IP) address of a user device with which the user interacts with the network-based service; and
   providing, with the computer, the IP address of the user device to a classifier, and receiving from the classifier a predicted geographic location for the IP address provided;
   wherein the classifier is a decision tree having a number of leaf nodes, wherein each leaf node associates at least one IP address with a predicted geographic location.

9. The computer-implemented method of claim 8, further comprising:
   obtaining, with the computer, information about a campaign targeting a user group in a geographic location; and
   transmitting the obtained information about the campaign to the user device.

10. The computer-implemented method of claim 8, further comprising converting the IP address into a finite number representation.

11. The computer-implemented method of claim 10, wherein the finite number representation is a 32-bit representation.

12. The computer-implemented method of claim 8, further comprising generating, with the computer, the decision tree through a machine learning based on a set of sample user data.

13. The computer-implemented method of claim 12, wherein the predicted geographic location is a most likely geographic location of the user based on the set of sample user data.

14. The computer-implemented method of claim 12, wherein the set of sample user data reflects a relationship between an IP address and a geographic location associated with a user.

15. The computer-implemented method of claim 8, wherein each leaf node of the decision tree records an accuracy number for the at least one IP address with respect to the associated predicted geographic location.

16. The computer-implemented method of claim 8, wherein the predicted geographic location of the user device is a country where the user device is located.

17. The computer-implemented method of claim 8, wherein the predicted geographic location of the user device is a state where the user device is located.

18. The computer-implemented method of claim 8, wherein the predicted geographic location reflects a preferred language in a locality of the user device.

19. The computer-implemented method of claim 8, wherein the classifier is constructed to return an accuracy number for the predicted geographic location associated with the identified IP address of the user device.

20. A computer system for determining a user group for a user whose identity is not recognized, the computer system comprising:
 a data store containing a classifier which is constructed to produce a predicted geographic location for a given internet protocol (IP) address; and
 a computing device in communication with the data store, wherein the computing device is configured to:
  obtain an IP address which is generated from an interaction of a user device with a network-based service;
  provide the IP address of the user device to the classifier;
  receive, from the classifier, a predicted geographic location associated with the IP address of the user device; and
  determine a user group that corresponds to the predicted geographic location;
 wherein the classifier is a decision tree having a number of paths, wherein the decision tree includes a number of leaf nodes and each leaf node of the decision tree associates at least one IP address with a predicted geographic location.

21. The computer system of claim 20, wherein the computing device is configured to obtain campaign information targeted to the user group and to transmit the obtained campaign information to the user device.

22. The computer system of claim 20, wherein the decision tree is generated through machine learning on a set of sample user data.

23. The computer system of claim 22, wherein the set of sample user data reflects a relationship between an IP address and a geographic location associated with a user whose identity is recognized.

24. The computer system of claim 20, wherein each path in the decision tree corresponds to an IP address in a finite number representation.

25. A method of operating a computer to generate a decision tree for predicting a geographic location based on an internet protocol (IP) address associated with a user, the method comprising:
 obtaining, with the computer, a first set of sample data which includes IP addresses and user profile information, wherein the user profile information includes geographic location information correlated with an IP address;
 training, with the computer, a decision tree with the first set of sample data, wherein each leaf node of the decision tree associates at least one IP address and a predicted geographic location;
 obtaining, with the computer, a second set of sample data which includes an IP address and user profile information including geographic location information correlated with an IP address;
 pruning, with the computer, the trained decision tree with the second set of sample data;
 obtaining, with the computer, a third set of sample data which includes IP addresses and user profile information including geographic location information correlated with an IP address; and
 qualifying the decision tree with the third set of sample data, wherein after qualification, each leaf node is assigned a confidence number, wherein the confidence number indicates a degree of accuracy of the predicted geographic location associated with at least one IP address corresponding to the leaf node.

26. The method of claim 25, wherein the first set of sample data, the second set of sample data, and the third set of sample data are collected from recognized users whose profile information is readily available.

27. The method of claim 25, wherein the trained decision tree is pruned in order to produce an optimal decision tree which has a small number of nodes.

28. The method of claim 25, wherein the trained decision tree is pruned in order to cure an overfitting problem of the trained decision tree.

29. The method of claim 25, further comprising feeding, with the computer, an IP address of a user into the qualified decision tree to obtain a predicted geographic location of the user.

30. The method of claim 29, further comprising ignoring, with the computer, the predicted geographic location if the confidence number for the predicted geographic location does not meet a threshold confidence level.

31. The method of claim 25, further comprising converting each IP address in the sample data into a finite number representation.

32. The method of claim 25, wherein a path in the trained decision tree corresponds to at least one IP address in a bit representation.

33. A non-transitory, computer-readable medium having computer-executable components encoded thereon that, in response to execution by a computer, cause the computer to map a predicted geographic location of a user to an internet protocol (IP) address, the computer-executable components comprising:
 a request process component for receiving information which is generated from a user's activities over a network, wherein the information includes an IP address associated with the user; and
 a classifier component for predicting a geographic location associated with the identified the IP address that is associated with the user;

wherein the predicted geographic location of the user is obtained from the classifier component; and wherein the classifier component is a decision tree in which the decision tree includes a number of leaf nodes and each leaf node of the decision tree associates at least one IP address with a predicted geographic location.

34. The non-transitory computer-readable medium of claim 33, further comprising a machine learning component to build the classifier component.

35. The non-transitory computer-readable medium of claim 33, wherein the classifier component is a machine learning decision tree.

36. The non-transitory computer-readable medium of claim 33, wherein each path in the decision tree corresponds to an IP address in a finite number representation.

37. A method of operating a computer to provide information targeted to a user when the user clicks on a webpage, the method comprising:

receiving, with the computer, clickstream information which is generated as the user clicks on the webpage, wherein the clickstream information includes an internet protocol address of a user device;

identifying, with the computer, the internet protocol address from the clickstream information;

providing, with the computer, the identified internet protocol address to a classifier;

receiving, with the computer, a predicted geographic location from the classifier, wherein the classifier is a decision tree trained to predict a geographic location for a given internet protocol address, and wherein the decision tree includes a number of leaf nodes and each leaf node of the decision tree associates at least one IP address with a predicted geographic location;

obtaining, with the computer, information targeted to a group of users in the predicted geographic location; and transmitting, with the computer, the obtained information to the user device.

* * * * *